INVENTOR:
JAN GEERTSMA
BY: *Joseph L. Strabala*
HIS ATTORNEY

United States Patent Office 3,353,602
Patented Nov. 21, 1967

3,353,602
VERTICAL FRACTURE PATTERNS FOR THE RECOVERY OF OIL OF LOW MOBILITY
Jan Geertsma, Rijswijk, Netherlands, assignor to Shell Oil Company, New York, N.Y., a corporation of Delaware
Filed Mar. 31, 1965, Ser. No. 444,216
Claims priority, application Great Britain, Sept. 10, 1964, 37,102/64
3 Claims. (Cl. 166—40)

ABSTRACT OF THE DISCLOSURE

A method of establishing fractures to aid in the recovery of viscous oil from formations by creating horizontal fractures and thereafter intersecting said fractures with vertical ones.

---

The present invention relates to a method of facilitating the production of petroleum from subterranean reservoirs by means of secondary recovery methods. More particularly, it is concerned with a method of creating vertical permeability by fracture patterns in such reservoirs containing an oil having a low mobility at the naturally existing conditions in the formation.

Vast quantities of useful petroleum products exist in large deposits in a very viscous condition, such as those deposits frequently referred to as tar-sands and many deposits of this type are well known; for example, the tar-sands occurring in Canada. Recovery by conventional production techniques of such high viscosity petroleum deposits, i.e., those having viscosities of 1,000 centiposes and above, is difficult because of the immobility of the viscous oil deposits.

Various secondary recovery techniques have been applied to subterranean reservoirs containing these viscous petroleum crudes. Some of these processes involve in situ combustion techniques having as their principal object the heating of the crude in the formation to high enough temperatures for the oil to become mobile in the formation so it will flow therefrom. Other systems involve the use of chemical agents in water and/or solvents which tend to dissolve or emulsify the viscous crudes so they can be displaced in the formation. For example, dilute aqueous alkali metal hydroxide solutions tend to emulsify the viscous crudes and facilitate their recovery. The use of steam, similar in effect to in situ combustion, tends to lower the viscosity of the oil by raising the temperature of the oil in the formation.

In most situations when using the above techniques, use is made of two wells penetrating the same formation and spaced from one another. In this manner, the injections can be accomplished in one well and recovery accomplished from another, often as a result of the driving pressure mechanism caused by the injection of the necessary materials to lessen the viscosity of the crude deposits. However, since the formations in which these viscous, tar-like crudes occur are relatively impermeable, it is necessary to establish fluid communication between the spaced wells by fracturing the oil/formation matrix. This factor has usually required that the spacing between the wells be small and necessitated that a large number of wells be drilled to recover a field, which places a high premium on the cost of the crudes recovered.

This invention resides in a novel fracturing technique which provides both horizontal and vertical fluid communication in the reservoir adjacent to the borehole so that various secondary recovery processes can be employed to recover the crudes of low mobility from the formation. It is possible to obtain most of the advantages experienced by using two spaced wells with this novel technique without the capital outlay of drilling two wells, since combination vertical and horizontal fracture patterns can be used like a horizontal fracture between spaced wells. Further, it is possible to recover much of the tar-like crude in the vicinity of the borehole initially and subsequently employ the borehole in combination with other wells spaced at greater distances. In the latter case, the well spacing can be considerably greater which gives an additional economical saving.

Broadly, the invention relates to a method of forming a unique fracture pattern in subterranean oil-bearing formations containing viscous crudes by drilling a borehole into the formation, creating a substantially horizontal fracture in at least one level of the formation, pressurizing the resulting horizontal fracture and subsequently subjecting the formation to a fracturing pressure fluid at a level below the horizontal fracture whereby a substantially conical fracture is formed that intersects the horizontal fracture.

In the practice of this invention, a technique used is to notch or underream a portion of the oil-bearing reservoirs contiguous to the borehole at a level near the top of the reservoir, severing or perforating the casing inserted into the borehole, and thereafter subject the formation to a pressurized fracturing fluid in the vicinity of the notch whereby a substantially horizontal fracture is formed radially outward from the notch. Thereafter, a second notch is similarly formed at a level near the bottom of the producing formation and the casing at said second location likewise severed or perforated. While the upper horizontal fracture is maintained under a pressurized condition, the formation contiguous of the lower notch is subjected to fluid fracturing pressures which will result in the formation of an upwardly inclined (conical) fracture pattern which intersects the horizontal fracture located above. If the borehole is not cased between the fracture points, the formation should be sealed off so that the fracturing pressures can be applied to the proper locations. Notching the formation is not necessary for making the fractures, but aids in controlling the fractures to some extent.

Once the fracture pattern has been established in the reservoir, a packer can be placed in the borehole between the two fractures and various fluids may be circulated through the fractures to aid in the recovery of the tar-like crudes. For example, steam can be caused to flow through the fractures to add heat to the viscous crudes adjacent to the fractures.

The invention may be practiced in various ways and some of the preferred embodiments will now be described by way of examples with reference to the accompanying drawings, in which.

Quite generally, the vertical fracture will have a basic conical pattern and will hereinafter be referred to as the conical fracture whether formed directly from a point adjacent to the lower portion of the borehole or formed from a horizontal fracture located in the bottom layers of the formation.

Figure 1:
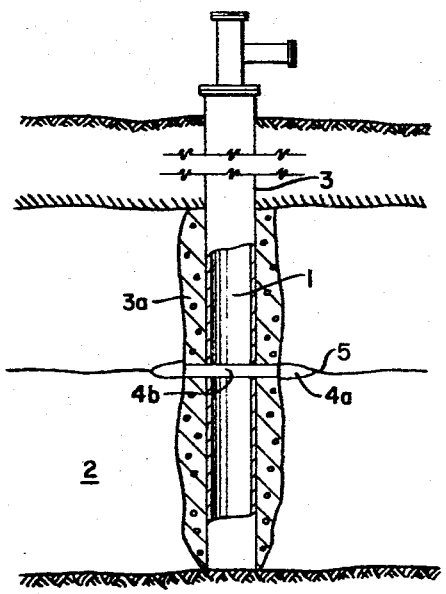
FIGURES 1, 2 and 3 show diagrammatical vertical sections of an oil-bearing formation illustrating the sequential events in the formation as the steps of the process according to the invention are carried out.
Figure 2:
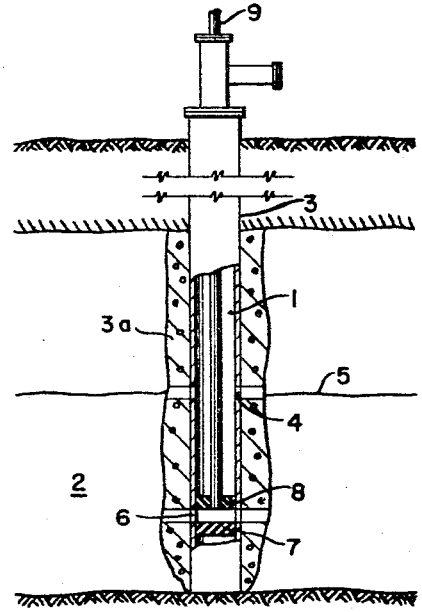

Describing the invention with reference to the figures, FIGURE 1 shows a borehole 1 which has been drilled into formation 2 which is an unconsolidated or partially consolidated oil-bearing formation containing a tar-like crude. While the formation is of a permeable nature, the pores between the grains are substantially filled with the very viscous oil (tar-like crude) which will not flow in the formation without the aid of extraneous energy, such as heat, pressure and/or chemical agents, to reduce the viscosity. Thus, the formation is not fluid permeable to a large extent and in order to make it fluid permeable, it must be fractured. Formation 2, containing the viscous oil, may be close to the earth's surface or may be covered by one or more layers of strata of differing nature.

After borehole 1 has been completed, it is preferably ceased and provided with the necessary completion equipment, such as wellhead and so forth. For the sake of simplicity, only a diagrammatical completion is shown with casing 3 cemented in borehole 1 with a sealant 3a. Once the well completion has been accomplished, fluid communication between the inside of casing 3 and formation 2 is established by a plurality of notches 4a and perforations 4 or a radial severance 4b of the casing 3 and the contiguous sealant 3a by means of a conventional perforating tool. The perforations 4 are located in the upper layers of formation 2. After the establishment of the fluid communication with formation 2, a fluid fracturing medium is injected via the inside of casing 3 and exerts a fracturing pressure on the formation through perforations 4.

The fracturing medium, preferably a liquid, is injected under a pressure which is sufficiently high to fracture the formation and, in most cases, will be at pressure equal to or exceeding the overburden pressures. Under these circumstances, a radially-extensive fracture 5 will tend to form in the upper levels of the formation 2 which is substantially in a horizontal plane. In some cases, it will be desirable to include propping agents in the fracturing fluid which has sufficient compressive strength to withstand the pressures developed on the propped fracture after the pressures have been released on the fracturing fluid and the fracture tends to close.

Generally, the fracturing fluid is injected into formation 2 through perforation 4 until fracture 5 has reached the desired radial extent. This can be determined by the use of small test holes located spaced distances from the borehole 1. If during the fracturing operation the fluid losses tend to be large, a plastering medium may be added to the fracturing fluid to contain it. Also the addition of the plastering medium may be desired in order to maintain the desired pressure on fracture 5 during the time that the second fracture is being formed since it will avoid the loss of the fracturing fluid to the formation or, at least, reduce it.

Before or after fracture 5 has been formed, another set of perforations 6 are provided in the wall of casing 3 below perforations 4 and generally in the lower portions of the formation 2. Like perforations 4, perforations 6 may be formed with conventional perforating tools and thereafter, straddle packers 7 and 8 are placed above and below perforations 6, thereby isolating a chamber within casing 3 having fluid communication with formation 2 through perforations 6. A conduit 9, passing downwardly through casing 3 and through the upper packer 8, connects the chamber formed between the straddle packers 7 and 8 with the surface and provides a means to inject fracturing fluids into the chamber at pressures greater than in annulus between the casing 3 and the conduit 9. If the lower end of casing 3 is sealed from communication with formation 2, the lower packer 7 may be omitted.

Figure 3:
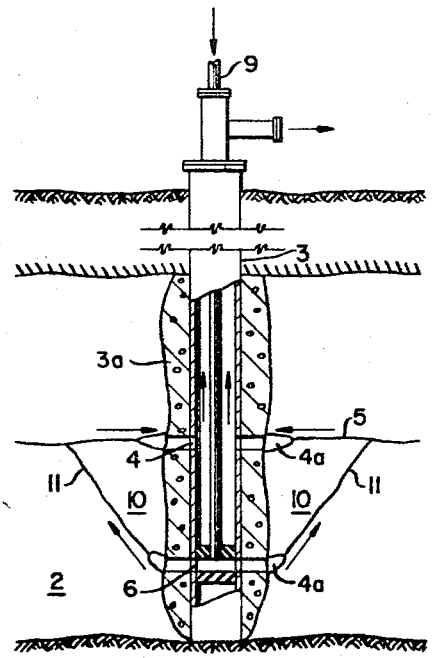

Thereafter, fracture 5 is pressurized by pressurizing the annular space between conduit 9 and the inside wall of casing 3. It is generally desired that the pressure in fracture 5 be at least somewhat above the overburden pressure at the level of fracture 5. As mentioned before, the plastering agent may be added to the fracturing fluid and it also can be added to the pressurizing fluid to minimize the loss of fluids during the period that fracture 5 is maintained under pressure. During the time that fracture 5 is pressurized as described above, fracturing fluid is injected under greater pressure through conduit 9 and exerts a fracturing pressure on formation 2 through perforations 6. The fluid fracturing medium exerting pressure on formation 2 tends to lift a conical-shaped part 10 of the formation, thereby creating a vertical (conical) fracture 11 as shown in FIGURE 3. Of course, propping agents may be added to the pressurized fluid in order to maintain high permeability in the fractures after the fracturing pressures have been reduced.

The fracture pattern (shown completed in FIGURE 3) created in formation 2 by the means of this invention, can yield substantial advantages when secondary recovery techniques are employed to recover the viscous crude from such a formation. For example, a displacing fluid, such as solvent, steam or emulsifier, can be injected under pressure through conduit 9, into the chamber between packers 7 and 8 and out into the fracture 11 through perforations 6. These displacing fluids then will move upwardly through fracture 11 and thence into fracture 5 from which they flow back into the annular space between conduit 9 and the inside of casing 3 through perforations 4. Through the use of appropriate equipment, the viscous crude displaced can be separated from the displacing fluid and it can be recirculated as described above. It is obvious that this technique allows a circulation pattern remote from the wellbore which is effective in displacing a greater volume of the tar-like crude adjacent to the borehole.

It should also be obvious that the direction of the displacing fluid can be reversed from that described above and in some cases, this would be advantageous since it allows the displacing fluid to take advantage of gravity drainage, especially when using heated fluids such as steam. In such a situation, the displacing fluid would pass from the annulus between conduit 9 and the inside of casing 3, through perforations 4 and into fracture 5. Sweeping through fracture 5, it would eventually move into fracture 11 and thence through perforations 6 into the chamber between packers 7 and 8 in the lower portions of the formation 2 from where it can be recovered.

Notwithstanding which way the displacing fluid is circulated, the viscosity of the low mobility oil contained in the formation, and especially within zone 10, is gradually reduced by thermal or solvent action. As this occurs, the mobility of the oil will increase and the volume of the crude produced will increase. Therefore, during the practice of this invention, a considerable amount of the oil surrounding the borehole will be recovered by secondary recovery techniques, both from within conical zone 10 as well as the portions of the formation 2 immediately adjacent to the fractures 5 and 11.

It is not intended that the invention be restricted to the production of the tar-like crudes by any particular secondary recovery treatment and even those methods involving in situ combustion can be used since the combustion front can move generally along fractures 5 and 11 to heat the oil immediately adjacent to these fractures. Many kinds of fluids are well known to the expert in this field, a few examples are hot water, steam, mixtures of hot water and steam, solvent and surface active agents combined with any of the above.

Obviously, it is desirable to increase the volume of the formation which is subjected to the secondary recovery techniques, making use of the fracture pattern prepared according to the invention. This can be accomplished in one of two ways. The first is by merely separating perforations 4 and 6 by a larger interval since this will tend to increase the volume of the conical zone 10 shown in FIGURE 3. Another way is to establish a pair of spaced horizontal fractures and form the conical fracture between these two horizontal fractures as indicated in FIGURES 4 and 5.

Figure 4:
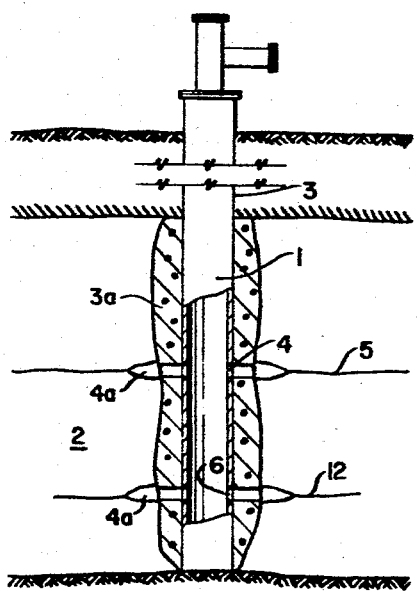
FIGURES 4 and 5 show a similar vertical section of an oil-bearing formation wherein the vertical fraction is formed between two horizontal fractures.
Figure 5:
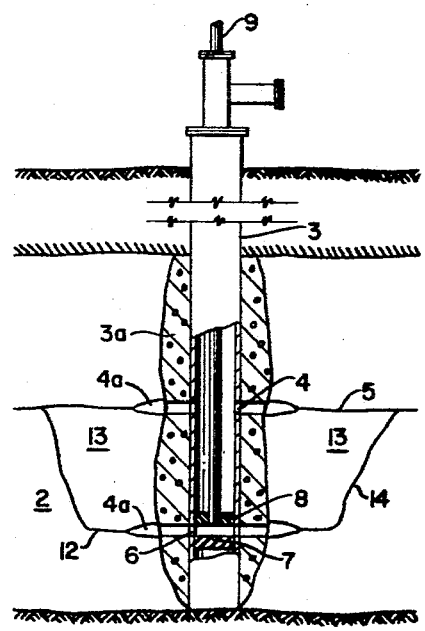

Specifically, this latter method of increasing the volume of the conical zone 10 of FIGURE 3 is shown in FIGURES 4 and 5. In making the fractures shown in these figures, a slightly different procedure is followed but the initial steps are similar in that borehole 1 is drilled into formation 2. This borehole is completed with a casing 3 cemented into place with a sealant 3a, as shown in FIGURES 1 through 5. After the well has been completed, perforations 4 and 6 are made in the walls of the casing in the upper and lower levels of reservoir 2, respectively. Either the upper or lower horizontal fractures 5 and 12, respectively, can be made as described above for the formation of fracture 5. Generally, the lower horizontal fracture 12 will be formed first and the upper horizontal fracture will be formed thereafter. However, it is possible to form fracture 5 first, but in such circumstances, fracture 5 is not generally pressurized during the formation of horizontal fracture 12, since if this were the case, fracture 12 would not extend horizontally but generally vertically or conically as shown in FIGURE 3.

In any case, the radial size of fracture 12 is preferred to be less than that of fracture 5 and this can be controlled by the use of reduced amounts of fracturing fluid which will result in a fracture of smaller dimensions.

After the formation of both horizontal fractures 5 and 12, a straddle packer system is set across perforations 6 so that its packers 7 and 8 isolate these perforations from the rest of the bore of casing 3. Conduit 9 extending downwardly inside casing 3 extends through the upper packer 8 and provides a passageway for fluids from the surface into fracture 12.

Referring to FIGURES 4 and 5, it is possible to create the conical zone 13 in formation 2 by keeping the pressure in fracture 5 equal to or greater than the overburden pressure at the level of fracture 5 while the pressure of the fluid fracturing medium at perforation 6 is increased until the conical fracture 14 forms. The formation of conical fracture 14 will be indicated by an increase in the pressure fluid in fracture 5. Generally, the conical fracture 14 starts at the periphery of fracture 12 and in such cases, the volume of formation 2 enclosed in the conical zone 13 is greater than when no horizontal fracture 12 is used in the bottom of formation 2 (see FIGURE 3).

Figure 6:
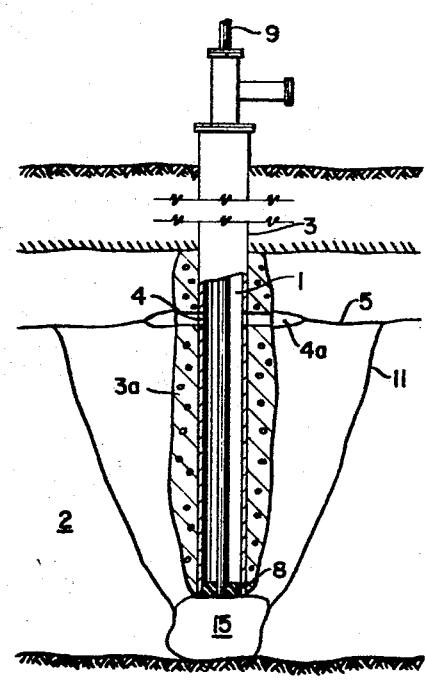
FIGURE 6 shows a similar vertical section wherein a relatively long vertical fracture has been formed.

In some cases, where the thickness of formation 2 is quite large, it may be desirable to increase the volume of formation 2 exposed to the fracturing pressures by underreaming or enlarging the contact volume in the vicinity of perforation 6. The equivalent of such a situation is shown ni FIGURE 6 where the open end of casing 3 is closed off by a packer and has an enlarged volume 15 below this packer 8. A conduit 9 extends from the surface down casing 3 and through the packer. Its bore provides fluid communication with this enlarged space 15. Thus, after the upper fracture 5 is formed and pressurized, a fracturing fluid is injected by a conduit 9 and passes into the enlarged space 15 below packer 8. As the pressure increases, a conical fracture, similar to those shown in FIGURES 1 through 3, will be formed.

It should be remembered that any of the fracturing media used for the practice of this invention can have plastering agents and/or propping agents contained therein to facilitate the objectives of this invention. Indeed, in many cases, it will be desirable to have one or the other, or both, and those skilled in the art will be able to determine quickly if these agents will be necessary depending on the formation.

These novel fracture patterns offer a great opportunity to decrease the capital outlay when recovering from underground reservoirs containing tar-like crudes. In addition, they may be used in many of the processes in which spaced well are now used since the vertical fluid communication to the reservoir is quite similar to the horizontal communication established in such older processes.

Further, it should be understood that the invention is not limited to the particular examples which have been included merely for illustrative purposes.

I claim as my invention:

1. A method of establishing a vertical fracture pattern in an oil-bearing formation comprising the steps of:
    (a) drilling a borehole into such an oil-bearing formation;
    (b) fracturing said formation in the upper portion thereof to create a first substantially horizontal fracture extending radially outwardly from said borehole;
    (c) reducing the pressure in said first horizontal fracture to below the overburden pressure;
    (d) fracturing said formation in a portion below said first horizontal fracture to form a second substantially horizontal fracture extending radially outwardly from said borehole;
    (e) pressurizing said first horizontal fracture to a pressure at least equal to the overburden pressure and maintaining said fracture at said pressure while
    (f) forming a conical fracture by subjecting said formation to fracturing pressure at said second horizontal fracture, said conical fracture interconnecting said first and second horizontal fractures.

2. A method of establishing a fracture pattern in an oil-bearing formation for improved oil recovery comprising the steps of:
    (a) drilling a borehole into such an oil-bearing formation;
    (b) fracturing said formation in the upper portion thereof to create a first substantially horizontal fracture extending radially outwardly from said borehole;
    (c) reducing the pressure in said first horizontal fracture to below the overburden pressure;
    (d) fracturing said formation in a portion below said first horizontal fracture to form a second substantially horizontal fracture extending radially outwardly from said borehole;
    (e) pressurizing said first horizontal fracture to a pressure at least equal to the overburden pressure and maintaining said fracture at said pressure while
    (f) forming a conical fracture by subjecting said formation to fracturing pressure at said second horizontal fracture, said conical fracture interconnecting said first and second horizontal fractures; and,
    (g) circulating steam through the fractures.

3. The method of claim 2 wherein the borehole is notched in the areas where it is horizontally fractured.

References Cited

UNITED STATES PATENTS

| 2,821,255 | 1/1958 | Spearow | 166—42.1 X |
| 2,839,141 | 6/1958 | Walter | 166—11 |
| 3,011,551 | 12/1961 | Young et al. | 166—42.1 X |
| 3,018,827 | 1/1962 | Henderson et al. | 166—42.1 X |
| 3,024,013 | 3/1962 | Rogers et al. | 166—42.1 X |
| 3,180,414 | 4/1965 | Parker | 166—40 X |
| 3,220,475 | 11/1965 | Brandon | 166—42.1 |
| 3,221,813 | 12/1965 | Clossmann et al. | 166—40 X |

OTHER REFERENCES

Why Should I Fracture My Well . . . and how? Tulsa, Okla., The Oil and Gas Journal, 1957, page E.

CHARLES E. O'CONNELL, *Primary Examiner.*

I. A. CALVERT, *Assistant Examiner.*